Jan. 17, 1933. A. LANGSNER 1,894,294
SLIDE RULE
Filed June 9, 1928 4 Sheets-Sheet 2

Jan. 17, 1933.  A. LANGSNER  1,894,294
SLIDE RULE
Filed June 9, 1928    4 Sheets-Sheet 3

Fig. 6.

Inventor:
Adolph Langsner,
By Cheever & Cox.
Attys.

Jan. 17, 1933. A. LANGSNER 1,894,294
SLIDE RULE
Filed June 9, 1928 4 Sheets-Sheet 4

Fig. 7.

Inventor:
Adolph Langsner,
By Cheever & Cox
Attys.

Patented Jan. 17, 1933

1,894,294

UNITED STATES PATENT OFFICE

ADOLPH LANGSNER, OF CHICAGO, ILLINOIS, ASSIGNOR TO EUGENE DIETZGEN COMPANY, OF CHICAGO, ILLINOIS, A CORPORATION OF DELAWARE

SLIDE RULE

Application filed June 9, 1928. Serial No. 284,130.

My invention relates in general to slide rules and more particularly to a novel scale arrangement in a slide rule whereby various calculations of a specialized nature may be accomplished with a minimum of slide rule manipulation and collateral calculation.

The slide rule of my present invention has special utility in facilitating the time-study of machining operations and numerous other industrial calculations and includes certain refinements and improvements whereby calculations of value to engineers and others engaged in calculating industrial operations involving the machining of materials, may be accomplished with unusual rapidity. The slide rule of my present invention is of such refinement that often with a "single" setting of the rule, several factors relating to the machining of materials may be accurately determined with a speed and facility not possible with similar devices heretofore provided, which require several "settings" and considerable collateral mathematical determination. I have accomplished the present improvement by providing certain novel scales and scale arrangements whereby the weight per foot of bar stock of various materials having various standard cross-sectional configurations may be determined by a single setting of the slide rule and whereby the number of pieces which may be cut from a unit length of stock or conversely the length of stock necessary to produce a given number of articles in a screw machine may be determined by a single slide rule setting or reading.

By simplifying the calculation of weight per foot of stock having a given cross-section and the number of articles per unit length of stock which may be made on a lathe or screw machine, I am able to reduce the effort and computations and consequently the time necessary in calculating the costs of performing a number of industrial operations. It will thus be apparent that my slide rule is of great assistance to engineers, time-study men and the like, particularly because it is adapted to perform ordinary slide rule calculations in addition to its specialized uses and because it is no larger in point of size than is the ordinary slide rule.

In the past, several slide rules have been specially designed to perform calculations of this general type, but all of them have been complicated and hard to manipulate, consisting of several slides mounted adjacently in a frame and none of them have been able to combine their special slide rule characteristics with the characteristics of an ordinary slide rule, being true special purpose slide rules and unable to perform the functions of a general purpose slide rule.

An important object of my present invention is to provide a slide rule of standard size and shape having certain novel scale arrangements whereby, in addition to being usable for the determination of problems involving multiplication, division, powers, roots, etc., in fact, any problem which may be determined on the ordinary Mannheim rule, it may also be used to determine certain specialized problems relating particularly and specifically to the working of materials as accomplished in the usual machine shop.

Another important object of my invention is to provide a slide rule of the class described and for the purposes described which has but one slide and which has logarithmic scales disposed and arranged thereon in such relationship that the various calculations for which the rule is primarily intended, may be made with a minimum of slide manipulation.

Another important object of my invention is to provide a slide rule of the class and for the purposes described which is neat, compact and readily portable without sacrificing the accuracy of the rule.

Still another important object of my invention is to provide in a logarithmic slide rule, a novel arrangement of scales whereby various production cost calculations may be accomplished with a minimum of slide rule manipulation and various related factors may be determined from a single slide rule setting, the scale arrangement of my present invention providing particularly for the solution of involved calculations pertaining more particularly to the various relationships maintained as to "Time", "Cutting speed", "Feed", "Length of cut", "R. P. M.", the hardness factor of the work material and the diameter of the work piece or of the cutting tool, in the cutting or machining of materials.

Still another important object of the invention is to provide a novel and improved slide rule construction whereby the parts may be accurately positioned in order that the body may grip the slide evenly at all points in its line of travel and whereby the frictional engagement of the body on the slide may be quickly, easily and positively adjusted.

Another important object of my invention is to provide a novel micrometer adjustment for slide rules whereby the frictional engagement of the slide in the body may be accurately controlled to the end that the slide may be quickly and easily placed in the best working condition no matter what weather conditions, which may cause the slide to stick or to slide too freely, may prevail.

Numerous other objects and advantages of the invention will be apparent as it is more fully understood from the following description which, taken in connection with the accompanying drawings, discloses a preferred embodiment of the invention.

Referring to the drawings.

To illustrate my invention I have shown on the drawings, in Figures 1, 2, 3 and 4, a slide rule construction comprising a body 11, a slide 13 relatively movable in the body and means for adjusting the grip of the body upon the slide whereby the frictional engagement between the relatively movable parts may be varied in order to attain greater accuracy in the manipulation of the slide rule. In the embodiment illustrated, the body comprises a base strip 15 having a substantially flat upper surface 17 and a lower surface provided with a substantially wide groove 19 formed longitudinally of the strip. Two strips 21 and 22 are secured to the upper surface 17 of the base strip 15. These strips extend longitudinally of the base strip in spaced relationship and are adapted to receive the slide 13 between their opposing surfaces, being provided with grooves 25 adapted to receive projecting flanges 27 formed in the edges of the slide. The outer surfaces of the strips 21 and 22 are provided with runner grooves 23 adapted to receive the inturned flanges of a slide rule runner 81 which may be of any preferred form or construction. The upper edge of the base strip 15 is mitered and provided with a diagonal scale surface 29 providing a straight edge 30 at its uppermost portions.

The strips 21 and 22, which I will hereinafter refer to as "slide retaining strips" are mounted in spaced relationship on the base 15 and carry scale surfaces 31 and 32 secured to their upper faces. These scale surfaces are adapted to receive scales and indicia forming various arrangements of logarithmic scales. The slide 13 also is provided with scale surfaces 35 and 37 which are secured respectively to the upper and lower faces of the slide. These scale surfaces are also adapted to receive scales and indicia forming various arrangements of scales adapted to be used in combination with the scales formed in the scale surfaces 31 and 32.

The slide retaining strip 21, in the present instance, is secured firmly along the lower edge of the base strip 15. This may be accomplished in any convenient manner such as by gluing, riveting or the like and, in order to provide for the adjustment of the spacing of the slide retaining strips 21 and 22 whereby their frictional engagement with the slide may be increased or diminished at will, I have provided an arrangement for mounting the upper slide retaining strip 22 adjustably to the base strip 15 and for controlling its position with respect to the base strip by means of threaded operating members 59 whereby a micrometer adjustment of the spacing of the slide retaining strips may be accomplished. In the embodiment illustrated, the slide retaining strip 22 is secured to the base strip 15 at three points by means of pegs 39 which are driven through the strip 22 at its central portion and at points spaced from its ends. These pegs are driven through the strip 22 from its upper surface before the scale surface 32 is fastened thereto as aforesaid. The pegs are provided at their upper ends with ears 41 which are adapted to be forced into the material of the strip in order to prevent relative rotation of the pegs therein. The lower end of each peg protrudes from the strip 22 and is housed in a substantially oval aperture 45 formed in the base strip 15 with its long axis extending laterally in the strip, that is to say, normally of the axis of the strip. A washer 47 having an oval aperture therein similar in size and shape to the cross-sectional contour of the aperture 45, is arranged in a socket 49 formed around the open end of the aperture 45 and its oval aperture forms a continuation of the aperture 45, the washer being held in place by a projecting lug 51 which is arranged to seat in a groove 53 formed in the body of the strip 15. The end of each peg 39 extends through the washer 47 and is provided with a retaining washer 55 which is secured to the end of the peg by riveting the end 57 of the peg over the washer. In this manner the strip 22 is secured firmly to the strip 15 but may be moved laterally thereon, the oval shape of the apertures 45 permitting the pegs 39 to move relatively to the strip 15 along paths perpendicular to the axis of the strip. In order to provide an accurate control of such relative movement I have provided a diametral threaded aperture 43 in the body of each peg 39. Each of these apertures is adapted to receive the threaded end 61 of adjusting members 59 which are housed in channels 63 formed in the body of the base strip 15 from the lower edge 77 thereof to the channels 45. Each adjusting member 59 is provided with a slotted end 65 whereby the adjusting members may be rotated. Upon rotation of the adjusting members, the pegs 39 and consequently the strip 22 may be moved laterally of the strip 15 and in this manner the spaced relationship between the slide supporting strip 21 and the movable slide supporting strip 22 may be accurately adjusted. In order to prevent the adjusting members 59 from moving longitudinally in the channels 63, I have provided, in each member 59, an annular groove 67 adjacent their outer slotted ends 65. These grooves are adapted to receive pins 69 which are arranged in channels or housings 71 each of which are formed in the base strip 15 at right angles to a channel 63 and opening thereinto in such a manner that when a pin 69 is arranged in position, it will engage the grooved portion 67 of a member 59 and prevent the axial movement of said member in its channel 63. The inner ends of the pins 69 extend into the strip 21, being housed in sockets 73 formed therein whereby to increase the strength of the attachment of the strip 21 to the base strip 15.

It will thus be seen that the device of my invention will provide an extremely accurate control of the spaced relationship between the slide retaining portions 21 and 22 whereby the frictional engagement of the slide 13 with the base 11 may be accurately controlled. The construction is rugged and simple and at the same time will afford a micrometer adjustment by virtue of the threaded connection between the adjusting members 59 and the pegs 39.

In order to provide a most useful combination of scales for my improved slide rule whereby the rule is usable as a special purpose slide rule for solving problems dealing particularly with the machining of various materials and also as a general purpose slide rule, I have provided novel scales, gauge marks and arrangements of indicia comprising logarithmic scales formed in the scale surfaces 31 and 32 of the slide rule body and the scale surfaces 35 and 37 of the slide.

Logarithmic scales of the type first illustrated and described by Gunter are, of course, well known as are slide rules embodying them and my present invention relates more especially to the relative arrangement of several logarithmic scales in a slide rule, whereby a rule having valuable characteristics and scope is provided. It should be understood that where I use the word "logarithmic" or "logarithm" in the following description, I am referring to the common logarithmic system, that is to say, the logarithmic system to the base 10. It should be understood, however, that my invention is not limited to an application of the common logarithmic system but may be applied in other logarithmic systems.

Figures 1, 2, 3, 4:
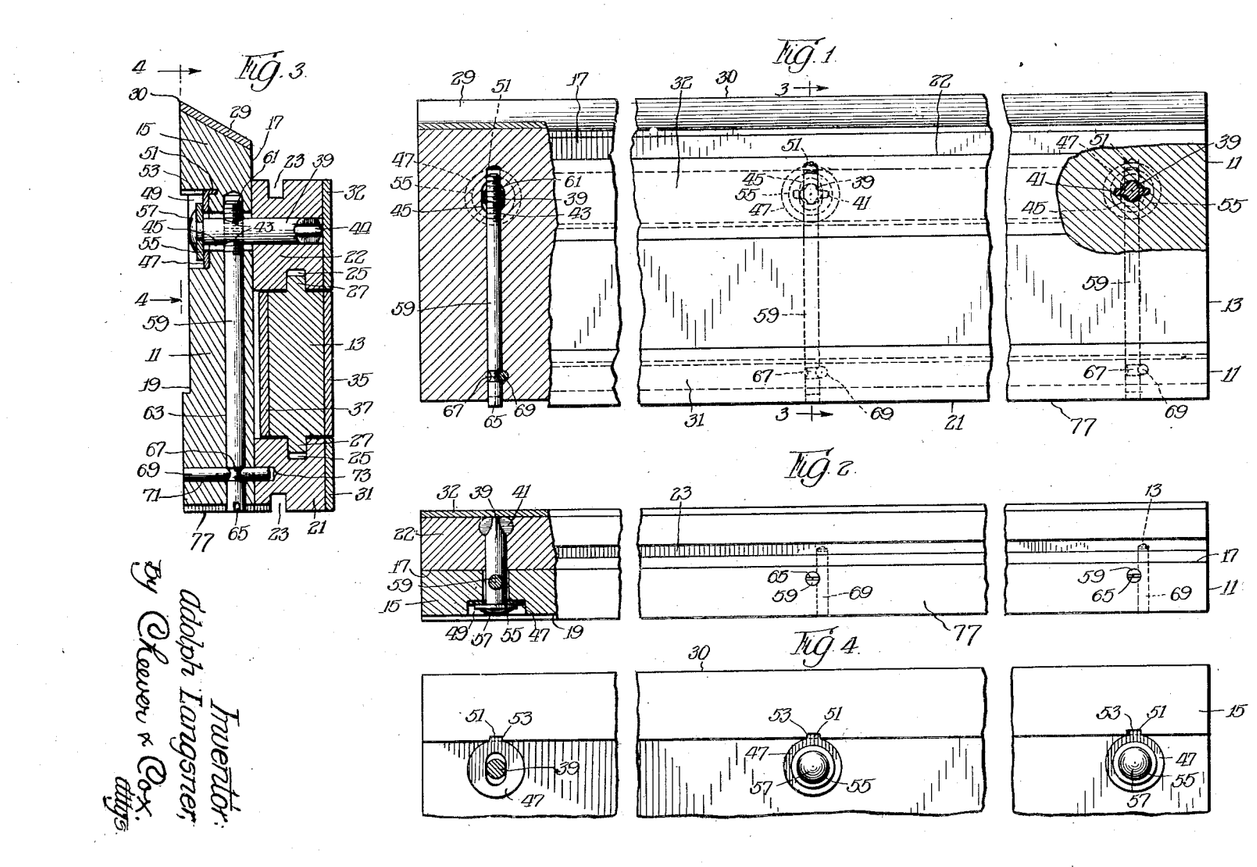
Figure 1 is a top plan view of a slide rule embodying a novel slide adjustment of my invention, parts of the illustration being shown in cross-section to reveal the details of construction.
Figure 2 is an elevation of the slide rule shown in Figure 1.
Figure 3 is a vertical cross-section taken substantially along the line 3—3 of Figure 1.
Figure 4 is a view in partial section taken substantially along the line 4—4 of Figure 3.
Figure 5:
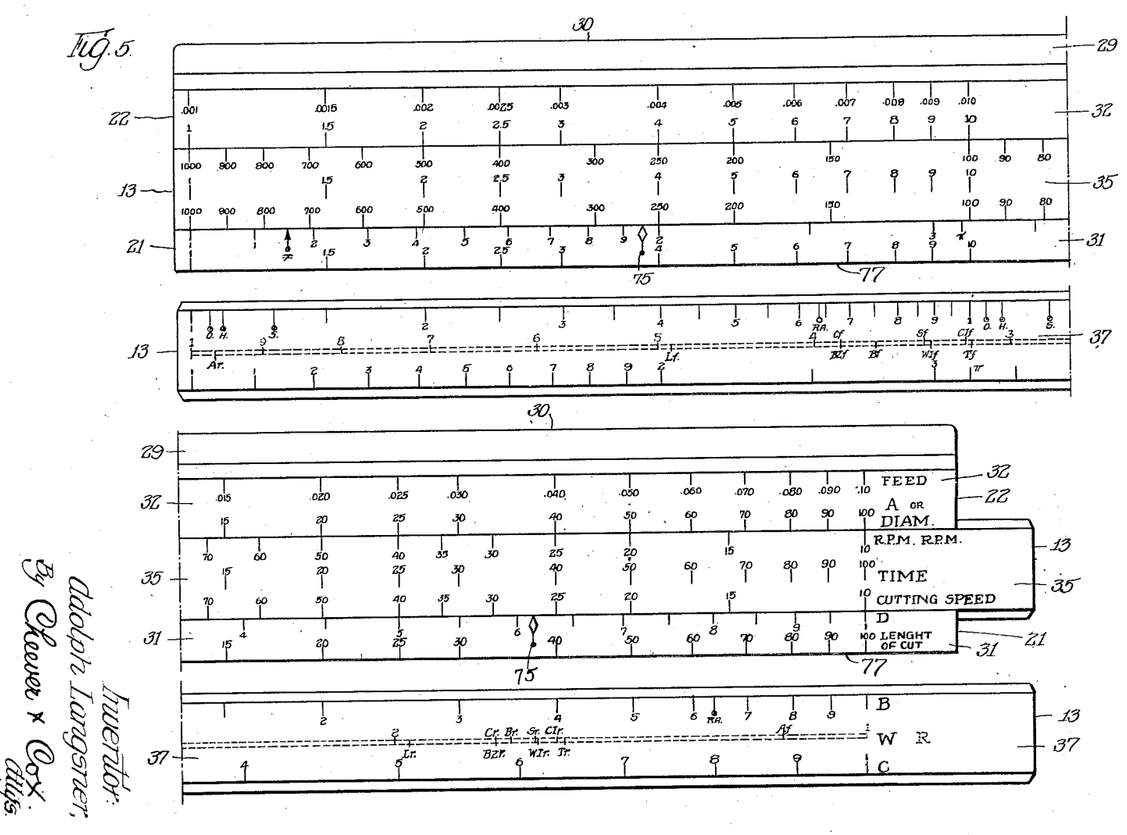
Figure 5 is a top plan view of the relatively movable scale surfaces of a slide rule and showing a scale arrangement of my invention.
Figure 6:
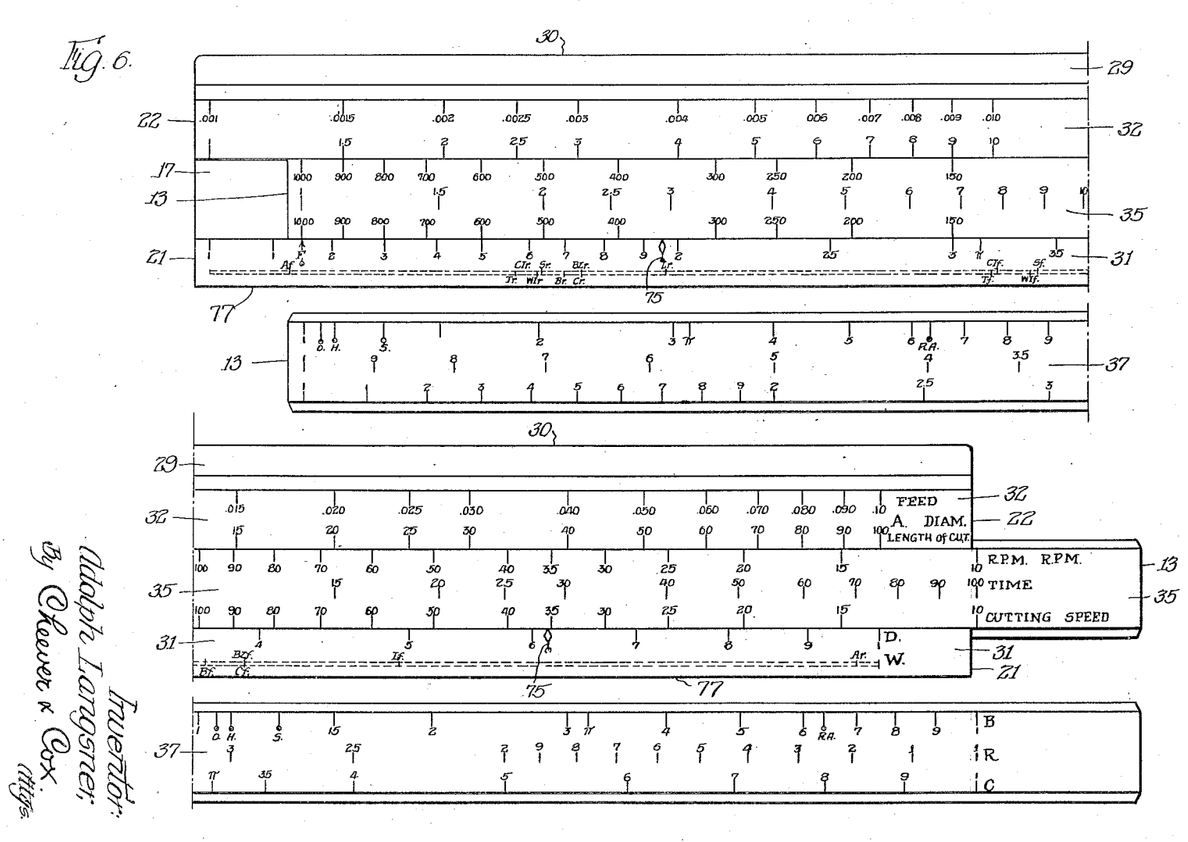
Figure 6 is a preferred arrangement or modification of the scale arrangement of my invention.

To illustrate my invention I have shown on the drawings, in Figures 5 and 6, two arrangements of logarithmic scales representing preferred forms of my invention. Both of these arrangements comprise a plurality of multi-cycle logarithmic scales arranged in the rule so that some of the scales are relatively slidable with respect to the others and some of the scales are relatively inverted with respect to other scales of the combination. It should be understood that when I use the terms "normal" and "inverted" scales, I do not necessarily mean scales which run from left to right and vice versa but simply mean that one scale is relatively inverted with respect to the other. The scales illustrated are particularly adapted to be applied in a slide rule of the ordinary mechanical form and construction comprising a body or fixed portion 11, including two spaced slide retaining portions 21 and 22 having scale surfaces 31 and 32 arranged on the upper faces thereof and a slide 13 carried between said retaining portions and having slide surfaces 35 and 37 respectively arranged at the upper or obverse and lower or reverse faces of the slide. Obviously any suitable arrangement may be employed to obtain relatively shiftable scale-carrying surfaces. Both embodiments illustrated comprise arrangements of logarithmic scales in each of which ten scales in all appear. Four of these scales are carried on the relatively fixed scale surfaces 31 and 32 of the body portion of the slide rule while three scales appear on each of the scale surfaces 35 and 37 of the slide.

For the sake of convenience I prefer to mark certain of the scales which are adapted to be used together in contrasting colors, and for this purpose I prefer to use the color red for certain scales which are used in conjunction and black for certain other scales. This assists in keeping the scales separated and distinguished. In the upper scale surface 32 of the body of the slide rule illustrated in Figure 5, I form two scales. These comprise, in the illustrated embodiments, double or two-cycle logarithmic scales, that is to say, two single logarithmic scales in tandem, the final graduations of the first scale forming the initial graduation of the second. The two double scales are aligned so that their initial and final graduations are in vertical registration in the scale surface. The upper scale is graduated from .001 to .10 in red and is labeled "Feed" in red, while the lower scale is graduated from 1 to 100 in black and is labeled "A" or "Diam." in black. In the lower scale surface 31 I have formed two logarithmic scales, the upper of which comprises a single logarithmic scale and the lower of which comprises a double or two-cycle logarithmic scale. These scales are of equal length and are aligned in the slide rule as to their initial and final unit graduations, both as to each other and with respect to the double or two-cycle logarithmic scales arranged in the scale surface 32. The upper single logarithmic scale is graduated from 1 to 10 in black and is designated by "D" in black, while the lower double logarithmic scale is graduated from 1 to 100 in black and is labeled "Length of cut" in black. In the illustrated embodiment, the Feed, Diameter, and Length of cut scales run from left to right, being so-called "normal" scales. It is, however, within the contemplation of my present invention to arrange the Feed, Diameter, and Length of cut scales running from right to left in the slide rule. In the scale surface 31 I also form a gauge mark in blue which I label "F". This mark is formed at a point coinciding with the 1161 point of the "D" scale and gauge marks 75 in red are formed respectively in the scale surface to coincide with the 1.9545 and 6.185 points of the "D" scale.

In the illustrated embodiments, the front or obverse scale surface 35 of the slide carries three logarithmic scales. These scales are of equal length and of length equal to that of the scales formed in the scale surfaces 31 and 32. These scales also are aligned vertically in the slide, that is to say, their initial and final graduation are in vertical registration across the slide. The first or upper scale preferably comprises a double or two-cycle logarithmic scale inverted with respect to the Feed and Diameter scales and graduated from 1000 to 10 in black and labeled "R. P. M." "R. P. M.", one "R. P. M." being in black and one in red. The second scale comprises a normal double or two-cycle logarithmic scale, that is to say, a scale directionally similar to the Feed and Diameter scales, and graduated from 1 to 100 in red and labeled "Time" in red. The third and lowermost scale is a double or two-cycle logarithmic scale directionally similar to the R. P. M. scale, that is to say, relatively inverted with respect to the Feed, Diameter, Length of cut, and Time scales, and graduated from 1000 to 10 in black and labeled "Cutting speed" in black. It will be noticed that the R. P. M. and Cutting speed scales are inverted with respect to the Feed, Diameter, Length of cut, and Time scales. This does not necessarily mean that the latter must progress from left to right while the R. P. M. and Cutting speed scales progress from right to left, but the Feed, Diameter, Length of cut, and Time scales may progress from right to left if the R. P. M. and Cutting speed scales in such case progress from left to right, i. e. are inverted with respect to the other scales. The gauge points 75 heretofore described as formed in the "D" scale at the 1.9545 and 6.185 graduations respectively have no connection with the "D" scale and are formed therein at these points merely to coincide with the .2618 points (.2618=3.14159/12) of the adjacent "Cutting speed" scale of the slide. The R. P. M. scale is in effect two scales and when used in its "black" aspect cooperates with the Diameter and Cutting speed scales and the gauge points 75, while in its "red" aspect cooperates with the Feed, Length of cut, and Time scales. The R. P. M. scale also acts as a transfer scale in computations involving all of the "red" and "black" scales.

In calculations pertaining to the machining of materials, it is usual that two or more factors at least are known. From these the unknown factors may be calculated. For example, the diameter of a cylindrical work piece to be turned or the diameter of a milling cutter may usually be determined by means of calipers, the speed of the machine also may be determined by means of a tachometer. In order to discover the cutting speed, it will be necessary to perform the calculation represented in the following formula:

$$\text{Cutting speed} = 3.14159 \times D \times \text{R. P. M.} \quad \ldots \quad 1$$

in which D=diameter of the work piece or cutter. Similarly to find the time of any operation, it will be necessary to solve the following formula:

$$\text{Time} = \frac{3.14159 \times D \times L}{\text{Feed} \times \text{cutting speed}} \quad \ldots \quad 2$$

in which D=diameter of the work piece or cutter, Feed=the distance advanced by the cutting tool with respect to the work piece per revolution of the work piece or cutter, L= the effective length of the work done on the piece.

Similar formulæ may be made to express other unknown factors as functions of known factors, and all these formulæ apply equally well to drilling as to the various cutting operations, such as threading, turning, milling, grinding, planing and the like.

It will be readily appreciated that to solve these equations with the aid of an ordinary logarithmic slide rule involves extended manipulation of the rule and where it is necessary to find factors such as Feed or Length of cut in Formula 2 above, the calculation may involve a large number of consecutive slide rule settings and resettings with the consequent danger of inaccuracy during the operations whereby errors in setting the rule are multiplied. There is also the disadvantage of having to remember intermediate factors between settings. Where such intermediate factors involve several settings of the slide rule, it is almost essential that they be noted on a tablet or memo sheet.

In the past, several slide rules have been specially designed to perform calculations of this general type, but most of them have been complicated and hard to operate and some have consisted of several slides mounted adjacently in a frame; none of them have been any material improvement over the original logarithmic rule except that the scales have been labeled differently to assist the particular calculations for which they are adapted. In such multiple slide rules there is still the necessity of making several consecutive settings of the slides in calculating the various unknown factors from given data; there is still the disadvantage of multiplying errors through resetting the various scales or through the disturbing of a previously set slide while setting an adjacent slide. The expense also of producing a multiple-slide rule is relatively large depending upon the number of slides involved; and the bulk of such a rule often reduces its portability so that it can only conveniently be used in an office and cannot be carried about in the engineer's pocket to be used on the spot where and when most useful.

Also the calculations, for which the rule of my present invention is particularly well adapted, relate to the rotation of a circular member of known diameter, such, for instance, as the calculation of the various related factors in the machining of a work piece on a lathe. Where a circular member is being rotated, the revolutions per minute may be expressed by the following formulæ:

$$R.\,P.\,M. = \frac{\text{Peripheral speed in feet per minute}}{\text{Circumference in feet.}}$$

$$= \frac{12 \times \text{Peripheral speed in feet per minute}}{\text{Circumference in inches.}}$$

$$= \frac{12 \times \text{Peripheral speed in feet per minute}}{3.14159 \times \text{Diameter in inches.}}$$

This relationship may be expressed as follows:

$$0.2618 = \frac{\text{Peripheral speed in feet per minute}}{R.\,P.\,M. \times \text{Diameter in inches.}}$$

Where machining is involved, peripheral speed is cutting speed, i. e., the speed of the relative movement between the work piece and the tool, and the formula may be applied equally to a stationary work piece and rotating tool or a rotating work piece and stationary tool. In the same way, a formula expressing time in minutes necessary to perform a given operation may be developed:

$$\text{Time} = \frac{\text{Total length of cut in feet}}{\text{Cutting speed in feet per minute.}}$$

$$= \frac{\text{Circumference of work in feet} \times \text{Number of revolutions for length cut}}{\text{Cutting speed in feet per minute.}}$$

$$= \frac{0.2618 \times \text{Diameter in inches} \times \frac{\text{Length cut in inches}}{\text{Feed per revolution in inches.}}}{0.2618 \times \text{Diameter in inches} \times R.\,P.\,M.}$$

$$= \frac{\text{Length cut in inches}}{\text{Feed per revolution in inches} \times R.\,P.\,M.}$$

$$= \frac{\text{Length cut in inches} \times 0.2618 \times \text{Diameter in inches}}{\text{Feed per revolution in inches} \times \text{Cutting speed in feet per minute.}}$$

This mathematical relationship may be expressed as follows:

$$\frac{\text{Time in minutes} \times \text{Feed per rev. in inches} \times \text{Cutting speed in feet per minute}}{\text{Length cut in inches} \times \text{Diameter of work piece in inches}} = 0.2618$$

It will be noticed that the constant 0.2618 appears in both of the above formulæ and that this is the point in the Cutting speed and R. P. M. scales opposite which the gauge points 75 are located.

On the lower or reverse scale surface 37 of the slide I have formed three scales, the upper scale comprises a double or two-cycle logarithmic scale graduated in black from 1 to 1 to 1 and is designated "B" in black. The lower scale comprises a single logarithmic scale and is graduated in black from 1 to 1 and is designated "C" in black. In the "B" scale I form certain gauge marks as follows:

Gauge points marked "O" in blue coinciding with the 1055 point;

Gauge points marked "H" in blue coinciding with the 1102 point;

Gauge points marked "S" in blue coinciding with the 1273 point;

Gauge points marked "R.A." in blue coinciding with the 6366 point.

In the scale surface 37 and intermediate the upper and lower "B" and "C" scales I have formed an entirely novel scale which I have labeled "W" in black. This "W" scale comprises a plurality of gauge marks formed at intervals in the scale and labeled respectively Ar, Lf, Cf, Bzf, Bf, Sf, WIf, CIf, Tf, Lr, Cr, Bzr, Br, Sr, WIr, CIr, Tr and Af, the indicia having "r" being formed in red and those having "f" being formed in black. These points are obtained from the specific gravity of various metals, to-wit: lead, copper, bronze, brass, steel, wrought iron, cast iron, tin and aluminum, which are commonly used in the machine shop, and represent logarithmic ratio factors expressing the relationship between the weight per foot of bar stock made of the materials and a cross-sectional dimension, the points in red applying to stock having circular cross-section while the black marks apply to stock of rectangular cross-sectional shape. These gauge points are determined as follows: The weight per cubic inch of the various metals is first determined. In the present instance these weights were taken from standard tabulations contained in various authoritative handbooks and the true weight per cubic inch of each metal determined as the average of the weights taken. In this manner the weight per cubic inch was found to be:

|  | Pounds per cubic inch |
|---|---|
| Aluminum | .09415 |
| Brass | .30370 |
| Bronze | .31950 |
| Copper | .31969 |
| Cast iron | .26605 |
| Wrought iron | .28060 |
| Lead | .41041 |
| Steel | .28277 |
| Tin | .26467 |

The weight per foot of round bar stock may be expressed by the following formula:

$$W = \pi \times \left(\frac{d}{2}\right)^2 \times l \times \text{weight/cubic inch}:$$

In which:
  $W$ = weight per foot of round stock,
  $d$ = diameter of stock in inches,
  $l$ = length of stock in inches.

By substitution:

$$W = \frac{3.14159}{4} \times d^2 \times 12 \times \text{weight/cubic inch}.$$

In arranging the above for application in a slide rule it is most convenient to reduce it to one variable, preferably the diameter, and a constant as in this way a constant ratio factor between the diameter and the weight may be expressed as a gauge point which may be used to enable the weight per foot of round stock of the material involved to be obtained with one slide rule setting.

The above formula, therefore, becomes:

$$W = d^2 \times 9.4248 \times \text{weight per cubic inch of material}.$$

By extracting square root, this becomes:

$$\sqrt{W} = d \times \sqrt{9.4248 \times \text{weight per cubic inch}}.$$

Substituting in this formula the weight per cubic inch of steel, .28277, the following is obtained:

$$\sqrt{W} = d \times 1.6325.$$

The value of a gauge point representing the ratio between the square root of the weight of a unit length (12 inches) of round steel stock and the diameter is found to be 1.6325. By multiplying the diameter of the rod by 1.6325 and squaring the product the weight per foot of round steel stock may be obtained. Similar values for the other materials may be similarly determined to be:

| Aluminum | 1.96550 |
| Brass | 1.6918 |
| Bronze | 1.7352 |
| Copper | 1.7358 |
| Cast iron | 1.5834 |
| Wrought iron | 1.6261 |
| Lead | 1.9667 |
| Steel | 1.6325 |
| Tin | 1.5793 | similar gauge points for flat stock, that is to say, stock having a rectangular cross-section may be similarly determined by applying the formula:

$$l = \frac{W}{12 \times w \times t \times \text{weight of material per cubic inch}}$$

in which:
  $w$ = width of bar in inches
  $t$ = thickness of bar in inches
  $l$ = length of bar in inches
  $W$ = weight per foot of stock Substituting known factors in this formula we find that, for flat (rectangular cross-section) steel bars:

$$W = w \times t \times 12 \times .28277$$
$$W = w \times t \times 3.39324$$

This gives a gauge point for flat steel bars of 3.39324. Similar gauge points may be determined for the other materials:

| Aluminum | 1.1298 |
| Brass | 3.6444 |
| Bronze | 3.8352 |
| Copper | 3.8352 |
| Cast iron | 3.1926 |
| Wrought iron | 3.3672 |
| Lead | 4.9249 |
| Steel | 3.3932 |
| Tin | 3.1760 |

These gauge points may be laid out by forming an inverted single logarithmic scale "R", as indicated in dotted lines in Figure 5, having its initial and final indices in alignment respectively with the final and initial indices of the "C" and "D" scales and forming gauge marks in the scale in coincidence with the calculated values enumerated above.

In laying out these eighteen gauge points on the slide rule, however, I prefer to use the formula:

Logarithm of the estimated number × length of scale = Distance from the right index.

The slide rule illustrated in the drawings is the so-called 10-inch slide rule and measures exactly 250 mms. from the initial to the final unit index marks of the various scales formed in the scale surfaces. Substituting in the above formula gives in millimeters the distances from the right index at which the various gauge points should be arranged. The following tabulation gives the distances in inches of the gauge points from a point aligned with the right index marks of the "B" and "C" scales as determined by the above formula:

| Gauge point | Distance from right index | Designation |
|---|---|---|
| 11298—Aluminum (flat) | 0.521695 | Af—Black |
| 15793—Tin (round) | 1.959425 | Tr—Red |
| 15834—Cast iron (round) | 1.964513 | Cir—Red |
| 16261—Wrought iron (round) | 2.078258 | Wlr—Red |
| 16325—Steel (round) | 2.095038 | Sr—Red |
| 16918—Brass (round) | 2.247560 | Br—Red |
| 17352—Bronze (round) | 2.355831 | Br—Red |
| 17352—Copper (round) | 2.355831 | Cr—Red |
| 19667—Lead (round) | 2.891189 | Lr—Red |
| 31760—Tin (flat) | 4.939877 | Tf—Black |
| 31926—Cast iron (flat) | 4.962172 | Cif—Black |
| 33672—Wrought iron (flat) | 5.189768 | Wlf—Black |
| 33932—Steel (flat) | 5.222353 | Sf—Black |
| 36444—Brass (flat) | 5.527934 | Bf—Black |
| 38352—Bronze (flat) | 5.746068 | Bf—Black |
| 38352—Copper (flat) | 5.746068 | Cf—Black |
| 49249—Lead (flat) | 6.815079 | Lf—Black |
| 96550—Aluminum (round) | 9.692657 | Ar—Red |

By laying off these points as indicated, the W scale may be arranged in the slide surface midway between the upper and lower edges. To determine the weight per foot of round stock all that is necessary is to set the gauge point corresponding to the material involved, opposite the right hand indices of the rule and on the "A" or "Diam." scale, above the point on the "C" scale representing the diameter of the bar, read the weight per foot of the bar. In effect this is to multiply the gauge point factor by the diameter and square the result, but is accomplished in one slide setting.

In order to facilitate the rapid determination of the weight per unit length of stock having cross-sectional configurations other than circular, I have provided the additional gauge points "O", "H", "S", and "R. A." in the reverse slide surface 37 of the slide. These gauge points are adapted to be used in combination with the "W" scale. These points give a comparison of the area of the section with respect to the area of a circle taken as unity. The ratios adopted are as follows:

Circle    =1.000
Square    =1.273
Hexagon   =1.102
Octagon   =1.055
Right angle= .6366

These ratios are section factors, that is to say, the weight of a round bar multiplied by the section factor will give the weight of a bar of equal length and similar material having a cross-section corresponding to the section factor. Having found the weight of a round bar having a diameter equal to the "side of the square", the "short diameter of a hexagon", the "short diameter of an octagon", the "side of a right angle", depending upon the shape under consideration, the weight of such supposititious round bar is multiplied by the section factor and the resulting product is the weight of one foot of metal stock having a cross-section of the shape under consideration. These gauge points are arranged in the "B" scale and are spaced therein respectively as follows: The "O" mark, representing octagon, is arranged to coincide with the 1.055 point, the "H" mark, representing hexagon, is arranged to coincide with the 1.102 point, the "S" mark, representing square, is arranged to coincide with the 1.273 point and the "R.A." mark, representing right angle, is arranged to coincide with the .6366 point. These gauge marks are repeated in the second half of the double logarithmic scale comprising the "B" scale.

For a 10-inch (250 mm.) rule these points are arranged in the "B" scale as per the following table:

| Point | Distance from left index | Mark |
|---|---|---|
| 1055 | 0.114432 inches | O (Octagon) |
| 1102 | 0.207592 inches | H (Hexagon) |
| 1273 | 0.515897 inches | S (Square) |
| 6366 | 3.956131 inches | RA (Right Angle) |

Having found the weight of the supposititious round bar on the "A" or "Diam." scale, it requires but one additional slide setting to apply the section factor.

In Figure 6 of the drawings I have shown a second and more desirable modification, from certain aspects, of the scale arrangements, as shown in Figure 5, whereby an additional scale is made more fully available for use to the end that the slide rule may be more easily manipulated.

In the modification in Figure 5 it is impractical from space considerations to place the "W" scale, especially where gauge points for a number of materials other than those shown are incorporated in the rule, upon the "R" scale. The "R" scale by itself is extremely useful and in order to separate the "W" and "R" scales and to simplify the rule, I combine the "Length of cut" scale which, in Figure 5, is shown arranged in the lower scale surface 31 of the body of the rule, with the "A" or "Diam." scale which is in the scale surface 32. Its place in the scale surface 31 is taken by a "W" scale which is formed in the same manner as the "W" scale in the combination illustrated in Figure 5, except that the "W" scale of the present combination is inverted with respect to the "W" scale previously described, that is to say. the gauge points instead of being laid out from the right index of the rule, are laid off from the left index. In the central portion of the reverse slide scale surface 37 which, in the embodiment illustrated in Figure 5, was occupied by the "W" scale, I have arranged a reciprocal or inverted normal logarithmic scale marked in black. This scale is of similar length to the "C" and "B" scales. The addition of the reciprocal or "R" scale in place of the "W" scale on the reverse side of the slide is of advantage since it eliminates intermediate slide settings when multiplication and division of more than two factors is undertaken using the "C", "D" and "R" scales.

It will be apparent that the slide rules embodying my present invention are adapted, on account of the provision of "Feed", "Diam.", "R. P. M.", "Time", "Cutting speed" and "Length of cut" scales, to perform all the calculations which may involve these quantities and in addition my present slide rule may be used to determine the weights of bar stock having any one of a number of cross-sectional configurations, and made of any one of a number of materials in common use. Since the cost of performing a given mechanical operation upon a bar of material may be expressed in terms of the weight of the material, it is apparent that my improved slide rule is particularly adapted to assist in determining the cost of performing various production operations upon bar stock having various cross-sectional configurations and made of various materials, and to materially reduce the effort in making various necessary calculations, and all this without destroying the general purpose capacities of the rule.

The gauge mark "F" heretofore described as being arranged in the scale "D" is for the purpose of determining the number of feet of bar stock required to produce a unit number of finished pieces in screw or cut-off machine where the length of a required piece and the width of the cut-off tool is known. This particular gauge point is present in the rules illustrated in both Figures 5 and 6 and is located 16.325 mms. from the left index on the "D" scale. This point represents the ratio of the length of a piece plus the width of the cut-off tool expressed in inches to the total length in feet of stock in standard 10-foot lengths necessary to produce 1000 pieces, and is determined in the following manner:

In screw machine work, the chucking length must be considered. This is the length necessary in each bar of stock for the machine to properly grip the stock during the cutting operation. In actual practice at least 4 inches are necessary. The standard length of bar stock for use in screw machines is 10 feet. If a chucking allowance of 4 inches is used, a total of 116 inches of stock available for machining purposes remains, that is to say, only 96.66% of the bar can be used to produce the complete product, i. e., a chucking efficiency of .9666. The relationship may be expressed as follows:

$$L = \frac{n(l+w)}{12 \times c.e.}$$

In which:
$L$ = total length in feet of stock (10 ft. length) required,
$l$ = length in inches of pieces produced,
$w$ = width of cut-off tool in inches,
$c.e.$ = chucking efficiency,
$n$ = number of pieces.

Transposing this formula the following proportion is obtained:

$$\frac{L}{l+w} = \frac{n}{12 \times c.e.}$$

Substituting in this formula the known or constant values assumed, the proportion becomes:

$$\frac{L}{l+w} = \frac{1000}{12 \times .9666} = \frac{100}{1.160}$$

a gauge point F, therefore, should be located at the 1.160 mark of the scale. As stated before, the gauge point "F" is located at 16.325 mms. from the left index of the "D" scale. This figure is for a standard 10-inch slide rule in which the "D" scale is exactly 250 mms. in length, and is determined by actual measurement, being the distance from the 1.160 mark to the nearest unity mark on the scale. From the above it will be apparent that by dividing the length of the piece plus the width of the cut-off tool in inches by 1.160, the number of feet of bar stock required to produce 1000 pieces will be indicated. This division may be easily accomplished by setting the unit index of the "C" scale opposite the "F" gauge point and reading on the "C" scale immediately over the "length of each piece plus the width of the cut-off tool" on the "D" scale, the number of feet of bar stock necessary to produce 1000 pieces.

It will be apparent that the slide rule of my invention is adapted, in addition to its special purpose capacity to perform nearly all the general purpose functions of an ordinary Mannheim slide rule. The scale arrangements of Figs. 5 and 6 however will not permit the determination of cubes and cube roots and I have illustrated in Figure 7 of the drawings a means whereby such determinations may be accomplished.

Figure 7:
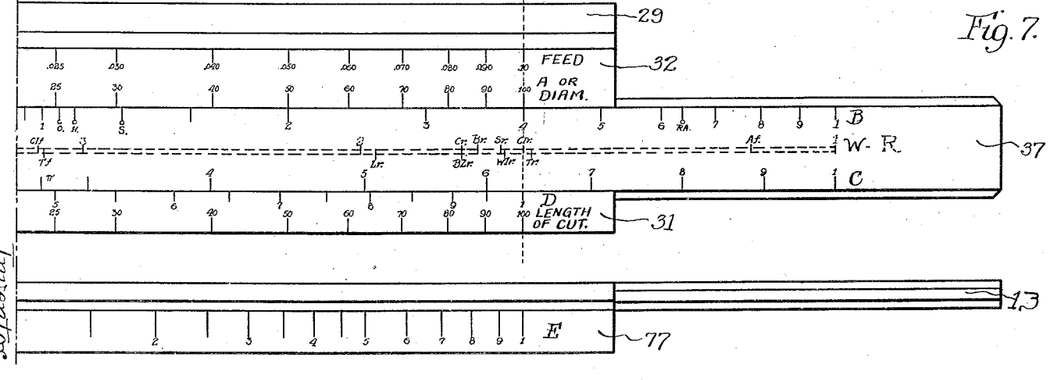
Figure 7 is a preferred form illustrating an improvement of the scale arrangements illustrated in Figures 5 and 6 whereby a new scale, adapted to increase the general purpose utility of the slide rule, may be added without increasing the size of the slide rule.

In the bottom edge surface 77 of the slide rule body I form a triple logarithmic scale labeled "E" in black. This scale is aligned in the surface 77 of the slide rule body so that its initial and final unit graduations register with the initial and final unit graduations of the "D" scale in the scale surface 31. In connection with this scale, the slide rule runner 81 is provided with a projecting tongue 79 adapted to overhang scale "E" and this tongue is provided with a scratch or similar linear indication 83 which is placed in the tongue in vertical alignment with the hair line of the runner. By using the hair line 85 of the runner on scale "D" and the scratch on scale "E", the cubes of the numbers indicated on scale "D" by the hair line may be read on scale "E" opposite the scratch and conversely the cube roots of numbers indicated by the scratch on scale "E" may be determined on scale "D" under the hair line.

The following tabulation will illustrate the method of operating the slide rules of my invention:

It will be noted that the foregoing computations, using the obverse side of the slide, involve the cooperation of the several two-cycle scales in pairs, that is to say, the diameter scale is always set against the R. P. M. scale, or vice versa; the Feed scale always is operated in conjunction with the R. P. M. scale, or vice versa, the Time and Length of cut scales cooperate the one with the other, while the Cutting speed scale enters the combination in conjunction with the gauge mark 75. It will be noted also that the Cutting speed scale and its cooperating gauge mark function in conjunction with the cooperating R. P. M. and Diameter scales, while the cooperating Length of cut and Time scales func-

*Using the reverse side of the slide*

| Calculation | Slide rule operation |
|---|---|
| To find weight per foot of round stock. (Figure 5) | Align index of "D" scale with red gauge point in "W" scale representing material of the stock, over the diameter of the stock on the "C" scale read the weight of the stock in pounds per foot on the "A" scale. |
| To find weight per foot of round stock. (Figure 6) | Align index of "C" scale with red gauge point in "W" scale representing material of the stock, over the diameter of the stock on the "C" scale read the weight of the stock in pounds per foot on the "A" scale. |
| To find weight per foot of stock having particular cross-sectional conformation. (Both forms) | Find weight per foot of suppositious round bar having diameter equal to "a cross-sectional dimension" of the stock on scale "A" as indicated above, align index of "B" scale with weight found on "A," over the section factor gauge mark read the weight per foot of the stock on "A" scale. |
| To find length of stock in standard 10-foot pieces necessary to produce 1000 pieces. (Both forms) | Align index of "C" scale with "F" gauge point in "D" scale, over length of piece plus width of cut-off tool on "D" scale read total length of stock required on "C" scale. |
| To find weight per 1000 pieces. (Both forms) | Find feet per 1000 pieces on "C" scale; find weight per foot on "A" scale, align index of "C" scale with weight per foot on "D" scale, under feet per 1000 pieces on "C" scale read pounds per 1000 pieces on "D" scale. |
| To find product or dividend of two numbers. (Both forms) | Use "A" or "Diam." scale and "B" scale or "C" and "D" scales as in the manipulation of the ordinary Mannheim slide rule. |
| To multiply or divide three or more numbers. (Both forms) | Use "C" and "D" scales in combination with the "R" scale as in the manipulation of the ordinary Mannheim rule. |
| To square or extract roots. (Both forms) | Use "D" and "A" or "Diam." scale "C" and "B" or "D" and "B" scales as in the manipulation of the ordinary Mannheim rule. |
| To cube | Set hair line of runner opposite number on "D" scale, read cube of number on "E" scale opposite scratch or runner. |
| To extract cube root | Set scratch on runner opposite number on "E" scale, read cube root of number on "D" scale under hair line of runner. |

*Using obverse side of the slide*

| Calculation | Slide rule operation |
|---|---|
| To find "Cutting speed" being given "Diam." and "R.P.M." | Set "R. P. M." to "Diam." over gauge mark (75) read "Cutting speed." |
| To find "R. P. M.," being given "Diam." and "Cutting speed." | Set "Cutting speed" over gauge mark (75), under "Diam." read "R. P. M." |
| To find "Diam.," being given "R. P. M." and "Cutting speed." | Set "Cutting speed" over gauge mark (75), over "R. P. M." read "Diam." |
| To find "Time" being given "R. P. M.," "Feed" and "Length of cut." | Set "R. P. M." under "Feed," over "Length of cut" read "Time." |
| To find "Feed" being given "R. P. M.," "Time" and "Length of cut." | Set "Time" over "Length of cut" over "R. P. M." read "Feed." |
| To find "R. P. M." being given "Feed," "Time" and "Length of cut." | Set "Time" over "Length of cut," under "Feed" read "R. P. M." |
| To find "Length of Cut" being given "R. P. M.," "Feed" and "Time". | Set "Feed" over "R. P. M.," under "Time", read "Length of cut." | tion in conjunction with the cooperating Feed and R. P. M. scales. It should be understood also that the scales may be located in the slide rule in any suitable or preferred arrangement giving the foregoing cooperating relationships. Certain of the scales may, if desired, be combined, the feasibility of such combination varying somewhat with the particular scale arrangement, which is or may be chosen for the embodiment of the invention.

It is thought that the invention and many of its attendant advantages will be understood from the foregoing description and it will be apparent that various changes may be made in the formation, construction and arrangement of the parts without departing from the spirit and scope of the invention or

*Combinations into which the side setting does not enter*

| Calculation | Slide rule operation |
|---|---|
| To square or extract roots | Use "A" or "Diam." and "D" scale as in the manipulation of the ordinary Mannheim rule. |
| To cube | Set hair line of runner opposite number on "D" scale, read cube of number on "E" scale opposite scratch on runner. |
| To extract cube root | Set scratch on runner opposite number on "E" scale, read cube root of number on "D" scale under hair line of runner. | sacrificing any of its material advantages, the forms herein described being merely preferred embodiments thereof.

Having thus described my invention, what I claim as new and desire to secure by Letters Patent is:

1. In a slide rule having relatively movable scale surfaces, scales formed and arranged in the scale surfaces and including a two-cycle logarithmic scale representing Time, a two-cycle logarithmic scale means representing R. P. M. and Cutting speed, said two-cycle scale means being relatively inverted with respect to the scale representing Time, said Time, R. P. M., and Cutting speed scales being formed in relatively stationary scale surfaces, and two-cycle logarithmic scales representing Feed, Diameter, and Length of cut formed in scale surfaces relatively movable with respect to the surfaces containing the Time, R. P. M., and Cutting speed scales.

2. In a slide rule having relatively movable scale surfaces, scales formed and arranged in the scale surfaces and including a two-cycle logarithmic scale representing Time, a two-cycle logarithmic scale means representing R. P. M. and Cutting speed, said two-cycle means being relatively inverted with respect to the scale representing Time, said Time, R. P. M., and Cutting speed scales being formed in relatively stationary scale surfaces and two-cycle logarithmic scales representing Feed, Diameter, and Length of cut, and a gauge mark, registering with the .2618 point in the Cutting speed scale when the scales are aligned in central position, formed in scale surfaces relatively movable with respect to the surfaces containing the Time, R. P. M., and Cutting speed scales.

3. In a slide rule having relatively movable scale surfaces, scales formed and arranged in the scale surfaces and including a pair of single logarithmic scales formed in a scale surface, one of the scales including a gauge point representing the specific gravity of a material formed in the scale surface with respect to the unity graduation of the scale taken as unity specific gravity, a single logarithmic scale and a double logarithmic scale of equal length formed in a relatively movable scale surface whereby the weight per unit length of a rod of the material may be determined by a single slide rule setting, and a triple logarithmic scale of equal length to the single scales and adapted to cooperate with a said single log scale whereby cubic relationships may be determined.

4. In a slide rule having a pair of relatively movable scale surfaces, a two-cycle logarithmic scale suitably graduated to represent Feed, and a two-cycle logarithmic scale graduated to represent Length of cut; said scales being formed in relatively stationary scale surfaces, a two-cycle logarithmic scale suitably graduated to represent Time, and a two-cycle scale relatively inverted with respect to the Feed, Time, and Length of cut scales and suitably graduated to represent R. P. M., all of said scales being of equal length and said Time and R. P. M. scales being formed in surfaces relatively movable with respect to the surfaces containing the Feed and Length of cut scales.

5. A slide rule including a pair of relatively slidable parts, one of which is formed with means providing two-cycle R. P. M. and Cutting speed scales and the other of which is formed with means forming a two-cycle Diameter scale reversed with respect to the R. P. M. and Cutting speed scales and a gauge point formed in the rule opposite a .2618 point in the Cutting speed scale when the scale carrying slide rule parts are centered with respect to each other.

6. A slide rule including a pair of relatively slidable parts, one of which is provided with means forming two-cycle scales representing R. P. M. and Cutting speed, and the other of which is provided with means forming a two-cycle scale relatively inverted with respect to the R. P. M. and Cutting speed scales and having unity graduations registering with the unity graduations in the other scales when the parts are centered and with a gauge mark registering with a graduation of the Cutting speed scale when the parts are centered, which said graduation has a numerical significance corresponding to the mathematical ratio:

$$\frac{\text{Time of operation} \times \text{Cutting speed} \times \text{Feed of tool per revolution}}{\text{Length of cut taken on work piece} \times \text{Diameter of work piece.}}$$

7. A slide rule including a pair of relatively slidable two-cycle logarithmic scales and a gauge point arranged in said rule in position to register with a graduation of one of the scales, when the moving parts of the rule are centered, said graduation representing the mathematical ratio:

$$\frac{\text{Time of operation} \times \text{Cutting speed} \times \text{Feed of tool per revolution}}{\text{Length of cut taken on work piece} \times \text{Diameter of work piece.}}$$

which exists in turning operations.

8. In a slide rule, a pair of relatively shiftable scale-carrying parts, scales formed and arranged in the scale-carrying parts and including a two-cycle logarithmic scale representing Time, a two-cycle logarithmic scale representing Length of cut, said Time and Length of cut scales being aranged in relatively movable scale surfaces, means forming a two-cycle logarithmic scale inverted with respect to the Time and Length of cut scales and graduated to represent R. P. M. and formed in a scale surface relatively stationary with respect to the Time scale, means forming two-cycle logarithmic scales representing Diameter and Feed, said Diameter and Feed scales being each relatively shiftable with respect to means forming an R. P. M. scale in the slide rule, a two-cycle logarithmic scale relatively inverted with respect to the Time and Length of cut scales and graduated to represent Cutting speed and a gauge mark formed in an adjacent part of the slide rule relatively shiftable with respect to the part in which the Cutting speed scale is formed, said gauge point being formed in the rule to register with the .2618 point in the Cutting speed scale when the same is centered with respect to the other scales.

9. In a slide rule having a pair of relatively shiftable scale-carrying parts, a plurality of two-cycle logarithmic scales formed and arranged in said scale surfaces, some of the scales being relatively inverted with respect to other scales formed in the scale carrying parts, said scales being arranged so that a pair of scales, similarly graduated and representing respectively Length of cut and Time, are on relatively shiftable parts, a pair of scales, representing Feed and Diameter, each formed on a part of the rule relatively shiftable with respect to another part carrying means forming a logarithmic scale relatively inverted with respect to the Feed and Diameter scales and graduated to represent R. P. M., a scale representing Cutting speed relatively inverted with respect to the Feed and Diameter scales, and a cooperating gauge mark on an adjacent part relatively shiftable with respect to the part carrying the Cutting speed scale, said gauge mark being located opposite the .2618 point in the Cutting speed scale when the same is centered in the rule with respect to the other scales carried thereon.

10. In a slide rule having a pair of relatively shiftable scale-carrying parts, a plurality of two-cycle logarithmic scales formed and arranged in said scale surfaces, some of the scales being relatively inverted with respect to the other scales, said scales being arranged so that a pair of scales, similarly graduated and representing respectively Length of cut and Time, are on relatively shiftable parts, a pair of scales, representing Feed and Diameter, each formed on a part of the rule relatively shiftable with respect to another part carrying means forming a logarithmic scale relatively inverted with respect to the Feed and Diameter scales and graduated to represent R. P. M., a scale representing Cutting speed relatively inverted with respect to the Feed and Diameter scales and a co-operating gauge mark on an adjacent part relatively shiftable with respect to the part carrying the Cutting speed scale, said gauge mark being located opposite the .2618 point in the Cutting speed scale when the same is centered in the rule with respect to the other scales carried thereon, said Cutting speed scale being formed for cooperation with the Diameter scale and its corresponding R. P. M. scale and being relatively stationary with respect to one of said cooperating scales, the gauge point being formed in a surface relatively stationary with respect to the other of said co-operating scales.

11. In a slide rule having a pair of relatively shiftable scale-carrying parts, scales formed and arranged on said parts to provide relatively shiftable two-cycle logarithmic scales providing cooperating pairs of scales including a Length of cut scale relatively shiftable with respect to another scale representing Time, a Diameter scale relatively shiftable with respect to an R. P. M. scale inverted with respect to the Diameter scale, a Feed scale relatively shiftable with respect to an R. P. M. scale relatively inverted with respect to the Feed scale, and a Cutting speed scale relatively inverted with respect to the Diameter scale and relatively shiftable with respect to a scale carrying part provided with a gauge mark therein, which, when the slide rule parts are centered, registers with a graduation on the Cutting speed scale representing the ratio:

$$\frac{\text{Time of operation} \times \text{Cutting speed} \times \text{Feed of tool per revolution}}{\text{Length of cut taken on work piece} \times \text{Diameter of work piece}}$$

which exists in turning operations.

12. In a slide rule having a pair of cooperating relatively shiftable scale-carrying parts, means forming two-cycle scales of equal length and aligned in said relatively shiftable scale surfaces when the slide rule parts are centered, certain of said scales being relatively inverted with respect to the other scales and arranged so that a two-cycle scale, representing Length of cut, has relatively shiftable co-operation with another two-cycle scale representing Time, a relatively inverted two-cycle scale representing R. P. M. has relatively shiftable cooperation with a two-cycle scale representing Feed, a relatively inverted two-cycle scale representing R. P. M. has relatively shiftable cooperation with a two-cycle scale representing Diameter, and a relatively inverted two-cycle scale representing Cutting speed has relatively shiftable cooperation with a gauge point located in the rule at a point opposite the .2618 mark of the Cutting speed scale when the slide rule is centered.

13. In a slide rule having a pair of relatively shiftable scale carrying parts, scales formed and arranged on said parts to provide relatively shiftable two-cycle logarithmic scales providing cooperating pairs including a two-cycle scale which has relatively shiftable cooperation with another two-cycle scale, a relatively inverted two-cycle scale which has relatively shiftable cooperation with a two-cycle scale and a relatively inverted two-cycle scale having shiftable cooperation with a gauge point on the rule in position to register, when the slide rule parts are centered, with a graduation of the inverted scale representing the ratio:

$$\frac{\text{Time of operation} \times \text{Cutting speed} \times \text{Feed of tool per revolution}}{\text{Length of cut taken on work piece} \times \text{Diameter of work piece}}$$

which exists in turning operations.

In witness whereof, I have hereunto subscribed my name.

ADOLPH LANGSNER.